(12) United States Patent
Frey et al.

(10) Patent No.: US 7,928,386 B2
(45) Date of Patent: Apr. 19, 2011

(54) ULTRA-SENSITIVE OPTICAL DETECTOR WITH HIGH TIME RESOLUTION

(75) Inventors: Laurent Frey, Fontaine (FR); Jean-Claude Villegier, Claix (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/911,667

(22) PCT Filed: Apr. 21, 2006

(86) PCT No.: PCT/FR2006/050368
§ 371 (c)(1), (2), (4) Date: Oct. 16, 2007

(87) PCT Pub. No.: WO2006/114540
PCT Pub. Date: Nov. 2, 2006

(65) Prior Publication Data
US 2008/0272302 A1      Nov. 6, 2008

(30) Foreign Application Priority Data

Apr. 25, 2005   (FR) ..................................... 05 51061

(51) Int. Cl.
*G01J 1/04* (2006.01)
(52) U.S. Cl. .................................................. 250/336.2
(58) Field of Classification Search ............... 250/336.2
See application file for complete search history.

(56) References Cited

U.S. PATENT DOCUMENTS

| | | | | |
|---|---|---|---|---|
| 4,299,490 A * | 11/1981 | Cahill et al. | ................... | 356/464 |
| 4,464,065 A * | 8/1984 | Wolf et al. | ..................... | 374/121 |
| 4,482,778 A * | 11/1984 | Anderson | ..................... | 136/246 |
| 5,171,733 A * | 12/1992 | Hu | ................ | 505/161 |
| 5,757,477 A * | 5/1998 | Nikitin et al. | .................. | 356/128 |
| 5,889,289 A * | 3/1999 | Cukauskas et al. | ............. | 257/33 |
| 6,100,525 A * | 8/2000 | Eden | ........................... | 250/338.1 |
| 6,442,321 B1 * | 8/2002 | Berini | ............................ | 385/130 |
| 6,812,464 B1 | 11/2004 | Sobolewski et al. | | |

(Continued)

FOREIGN PATENT DOCUMENTS
FR  2 812 455  2/2002

OTHER PUBLICATIONS

Villatoro et al. Sensitivity of (bio)chemical sensors based on laser-excited surface plasmon resonance, SPIE vol. 3878 (Sep. 1999), pp. 358-364.*

(Continued)

*Primary Examiner* — David P Porta
*Assistant Examiner* — Shun Lee
(74) *Attorney, Agent, or Firm* — Oblon, Spivak, McClelland, Maier & Neustadt, L.L.P.

(57) ABSTRACT

An ultra-sensitive optical detector with large time resolution, using a surface plasmon. The optical detector is configured to detect at least one photon, and including a dielectric substrate, and on the substrate, at least one bolometric detection component, that generates an electrical signal from the energy of received photon(s). Additionally, at least one coupling component is formed on the substrate, distinct from the detection component and including a metal component, and generates a surface plasmon by interaction with the photon(s) and guiding the plasmon right up to the detection component, which then absorbs the energy of the surface plasmon.

14 Claims, 11 Drawing Sheets

U.S. PATENT DOCUMENTS

Figure 1A:
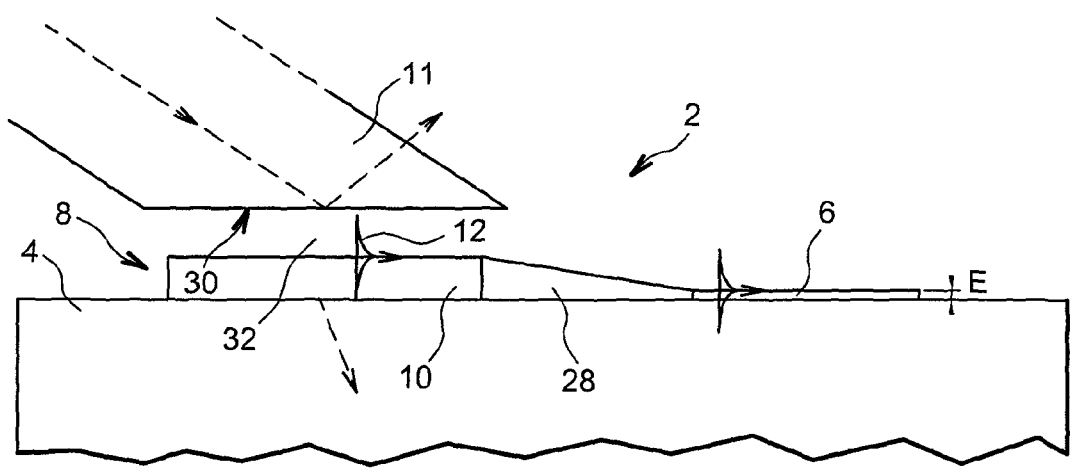

2002/0186950 A1* 12/2002 Mule' et al. .................... 385/132
2003/0179974 A1*  9/2003 Estes et al. ........................ 385/2
2003/0206708 A1   11/2003 Estes et al.

OTHER PUBLICATIONS

Ishi et al. Si nano-photodiode with a surface plasmon antenna, Japanese Journal of Applied Physics, vol. 44, No. 12, (Mar. 2005), pp. L364-L366.*
U.S. Appl. No. 11/861,876, filed Sep. 26, 2007, Frey.
U.S. Appl. No. 11/915,946, filed Nov. 29, 2007, Frey et al.
Alexander Korneev, et al., "GHz Counting Rate NbN Single-Photon Detector For IR Diagnostics of VLSI CMOS Circuits", Microelectronic Engineering, vol. 69, 2003, pp. 274-278.
A. Korneev, et al., "Sensitivity And Gigahertz Counting Performance of NbN Superconducting Single-Photon Detectors" Applied Physics Letters, vol. 84, No. 26, Jun. 28, 2004, pp. 5338-5340.
J. R. Krenn, et al., "Non-Diffraction-Limited Light Transport By Gold Nanowires", Europhysics Letters, vol. 60, No. 5, 2002, pp. 663-669.
P. Lecoupanec, et al., "An Ultra-Low Dark Count And Jitter, Superconducting, Single-Photon Detector For Emission Timing Analysis Of Integrated Circuits", Microelectronics Reliability, vol. 43, 2003, 1621-1626.
Thomas Nikolajsen, et al., "Polymer-Based Surface-Plasmon-Polariton Stripe Waveguides at Telecommunication Wavelengths", Applied Physics Letters, vol. 82, No. 5, Feb. 3, 2003, pp. 668-670.
Sharee J. Mcnab, et al, "Ultra-Low Loss Photonic Integrated Circuit With Membrane-Type Photonic Crystal Waveguides", Optics Express, vol. 11, No. 22, pp. 2927-2939, Nov. 3, 2003.
R. Romestain, et al, "Fabrication Of Superconducting Niobium Nitride Hot Electron Bolometer For Single-Photon Counting", New Journal Of Physics, vol. 6, 2004, pp. 1-15.
G. Schider, et al, "Plasmon Dispersion Relation of Au and Ag Nonowires", Physical Review B, vol. 68, 2003, pp. 155427-1-155427-4.
Mark I. Stockman, "Nonofocusing of Optical Energy in Tapered Plasmonic Waveguides", Physical Review Letters, vol. 93, No. 13, 2004, Sep. 24, 2004, pp. 137404-1-137404-4.
A. Verevkin, et al, "GHz-Rate Superconducting Photon Counting Detector", Single Photon Workshop, Apr. 1, 2003, 16 pages.
Jean-Claude Ville'gier, et al, "NbN Multilayer Technology on R-Plane Sapphire", IEEE Transactions on Applied Superconductivity, vol. 11, No. 1, Mar. 2001, pp. 68-71.
Jean-Claude Weeber, et al, "Plasmon Polaritons of Metallic Nanowires For Controlling Submicron Propagation of Light", Physical Review B, vol. 60, No. 12, Sep. 15, 1999, pp. 9061-9068.
J-C. Weeber, et al, "Near-Field Observation of Surface Plasmon Polariton Propagation on Thin Metal Stripes", Physical Review B, vol. 64, 2001, pp. 045411-1-015411-9.
Jiri Homola, et al., "Surface Plasmon Resonance Sensors: Review", Sensors and Actuators B, vol. 54, No. 1-2, XP004163207, Jan. 25, 1999, pp. 3-15.
Deborah Jackson, et al., "High Bandwidth, Improved Quantum Efficiency Detector Development for Multi-GHz Class QKD Throughput", Jet Propulsion Laboratory, California Institute of Technology, vol. 79, No. 6, Aug. 6, 2001, 7 pages.
Robert M. Dickson, et al., "Unidirectional Plasmon Propagation in Metallic Nanowires", J. Phys. Chem. B, vol. 104, No. 26, 2000, pp. 6095-6098.
H. Ditlbacher, et al., "Efficiency of Local Light-Plasmon Coupling", Applied Physics Letters, vol. 83, No. 18, Nov. 3, 2003, pp. 3665-3667.
G. N. Gol'tsman, et al., The Institute of Electrical Engineers, Stevenage, GB, Database Accession, AN—7711538, XP002361462, Jun. 2003, 1page.
G. N. Gol'tsman, et al., "Fabrication of Nanostructured Superconducting Single-Photon Detectors", IEEE Transactions on Applied Superconductivity, vol. 13, No. 2, XP-002361460, Jun. 2003, pp. 192-195.

* cited by examiner

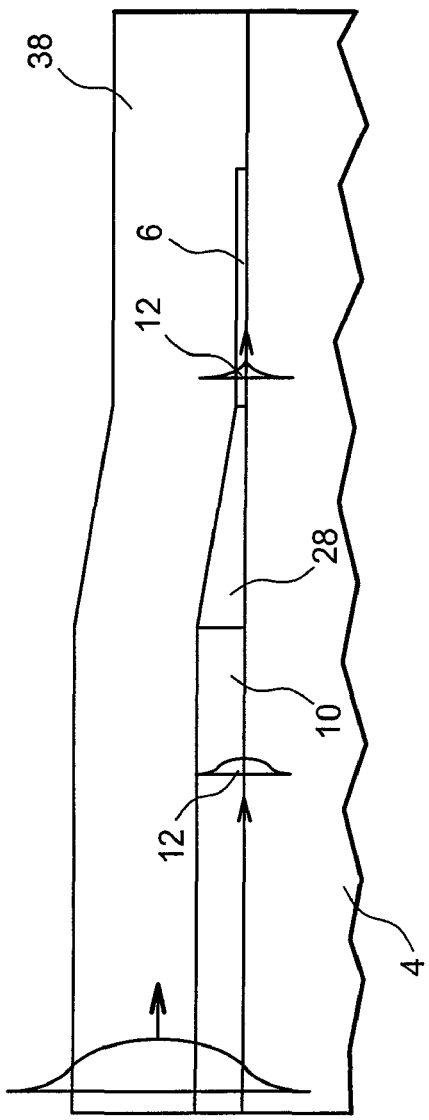
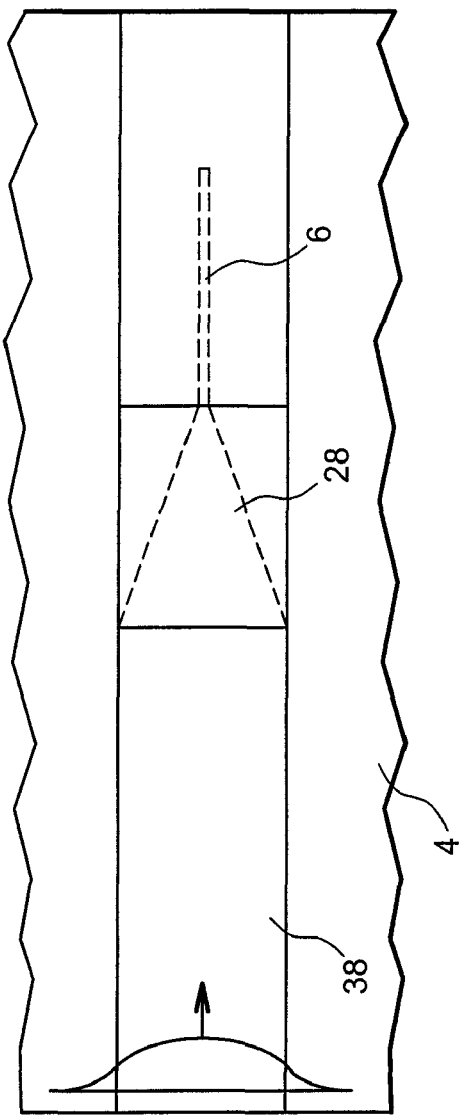
FIG. 4A
FIG. 4B

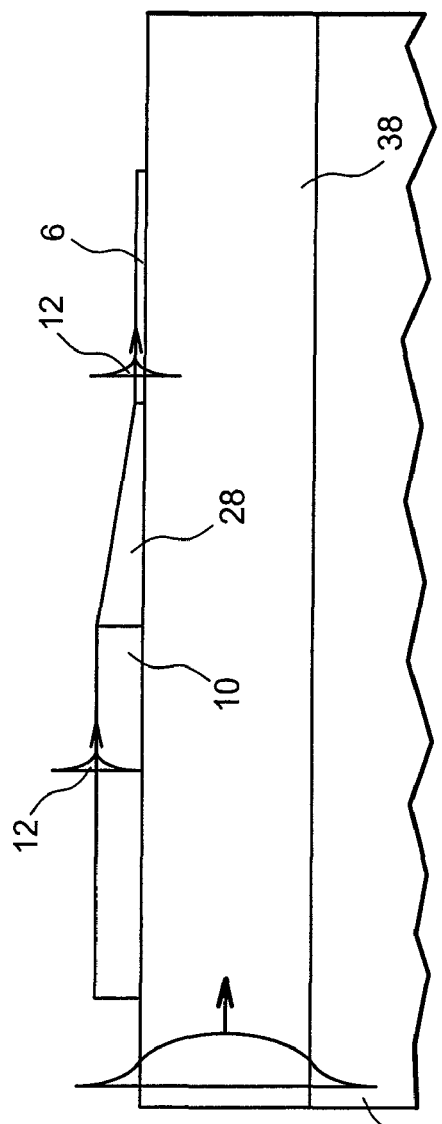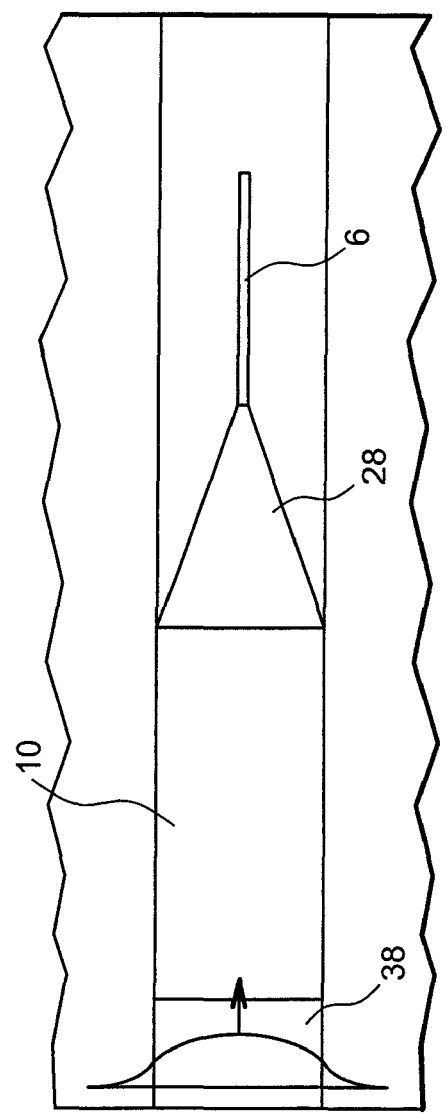
FIG. 5A
FIG. 5B

ULTRA-SENSITIVE OPTICAL DETECTOR WITH HIGH TIME RESOLUTION

TECHNICAL FIELD

The present invention concerns an ultra-sensitive optical detector with large time resolution, and notably a superconducting single photon detector.

The invention is notably applied to the detection and to the localization of faults in the operation of a semiconducting integrated circuit, by detecting the emission of specific photons by faulty transistors.

It also applies to receiving and routing circuits for very high throughput telecommunications, in particular to those which are intended for telecommunications satellites, because of the very small heat dissipation of the detector, object of the invention.

The invention further applies to detecting the key of the quantum code in a cryptography system.

It also applies to detecting biological or medical objects by tomography as well as to the astronomical observation of remote objects.

STATE OF THE PRIOR ART

Emerging techniques such as quantum computation and cryptography, detection of very weak signals for telecommunications or astronomy, contactless diagnostics of integrated circuits in micro-electronics or detection of biological objects, require detectors of radiations in particular in the visible range or the near infrared range, which are very fast, have very small jitter, produce very little noise and are extremely sensitive: they should be capable of detecting a single photon.

On this matter, reference will be made to document [Verevkin 03] which, like the other documents cited subsequently, is mentioned at the end of the present description.

The superconducting single photon detectors, also called SSPDs, potentially have all the aforementioned properties, and are good candidates for replacement of avalanche photodiodes and present photomultiplier tubes, the performances of which are limited, especially in the infrared.

The different types of SSPD may be classified into two categories, i.e. the STJs or superconducting tunnel junctions, and bolometers including HEBs (hot electron bolometers) which form the fastest class.

HEBs use ultra-thin superconducting films the thickness of which is less than 10 nm, in order to obtain very short characteristic times of the order of 10 ps. For these films, the favorite material is niobium nitride (NbN) in the cubic phase B1.

In a known HEB, a very thin NbN film is epitaxied on a sapphire substrate, the orientation of which is $1\bar{1}02$ (R plane); and after structuration, this film forms meanders for which the width ranges from 100 nm to 200 nm.

The manufacturing, operation and characterization of such SSPDs are for example described in [Gol'tsman 03] and in [Korneev 03]. The detection efficiency or the efficiency for converting the photon into an electric signal, is a key parameter which should be optimized and which would be 100% for an ideal detector.

It depends on the filling factor (overlap factor for the incident beam and the active area of the detector), on the optical absorption in the NbN layer and in the capacity of the hot spot, which is formed subsequently to absorption of the photon, of generating a resistive barrier over the whole width of the superconducting strip. A distinction is made between the detection efficiency and the quantum efficiency, which is defined for an overlap factor of 100%.

The meander structure was devised in order to have a correct filling factor. In the latter realizations, the interval between two strips of this structure is as small as the width of the superconducting strip and the filling factor is about 50%. It cannot hardly exceed this value because of present technological limitations, associated with electron lithography which is used for forming the meander structure.

Better overlap factors may be contemplated with other techniques, but a structure with meanders which are too close to each other promotes cross-talk and leads to an increased length of superconducting material.

Absorption by NbN is of the order of 20% for a thickness of 4 nm. The only way to increase it would be to increase the thickness of the NbN layer, but the ratio between the section of the hot spot and that of the superconducting strip would decrease, since the width of this strip is limited to 100 nm by the electron beam, and this would cause a fall in the global efficiency (see [Korneev 03]).

The detection efficiency cannot therefore exceed about 15% with this architecture. It reaches 5% to 7% with the wavelengths used for telecommunications in the last generation of detectors (see [Korneev 04]).

It would probably be difficult to do better because the very large length of the NbN strip (150 μm to 200 μm when this strip is <<unrolled>>) has two drawbacks, i.e. non-uniformity of the width of the line and classical or quantum fluctuations of the superconducting fluid, which do not leave much hope for approaching maximum efficiency.

Several approaches have been proposed in order to increase the coupling of the light in the absorbing region of the detector.

For example, the use of a mirror and a possible anti-reflection layer has been proposed. The light which has crossed the NbN without having been absorbed is then sent back onto the NbN by a concave mirror (see [FR 2812455]) or by a plane mirror (see [LeCoupanec 03]). The NbN film is possibly covered with an anti-reflection layer so as to eliminate losses by reflection of the incident wave.

The expected detection efficiency is 40% but it is anyhow limited by the filling factor (50%) which is inherent to any film design which is struck under normal incidence.

The use of a coupling by a waveguide (see [JPL 03]) was also proposed. The incident light then propagates in a planar silicon waveguide. The serpentine deposited thereon absorbs the evanescent wave associated with the guided mode and the photon is able to be absorbed at each passage of the evanescent wave by a line of the meander. The NbN thickness crossed at each passage (100 nm to 200 nm) is much larger than in the case of normal incidence where this thickness is 4 nm. But, as the major portion of the intensity passes through the guide, many meanders are required for absorption to be complete.

The efficiency may in principle reach very high values but it is there also limited by the very large length of the superconducting strip. Further, from a technological point of view, feasibility of growing monocrystalline NbN on Si has not yet been clearly demonstrated.

DISCUSSION OF THE INVENTION

The meander structure, an optical coupling device presently applied in NbN HEBs, is not optimized because of the not very high filling factor, of the too weak absorption by the NbN layer, and of the large length of the meanders which increases noise and degrades the electrical characteristics because of non-uniformities in the width of the meanders.

Consequently, detection efficiency is limited to 20% in the visible range. With the wavelengths used for telecommunications, it is even lower (less than 10%) and noise is larger because the photon energy is lower. A pixel of larger size, better suited to higher wavelengths would require even longer meanders.

The design of the detector (for example of the SSPD, more specifically the HEB), which is proposed in the present invention, abandons the meander structure with its limitations. Its originality lies in the optical addressing of the photon towards a detector, notably a superconducting detector with an optimized geometry, via surface plasmons which are guided in a metal guide. The optical coupling areas and those of detection by the HEB are now separate.

The present invention has various advantages.

In particular, optical coupling is significantly more efficient than in the meander structure. Indeed, the filling factor is close to 100%.

Further, the energy is entirely absorbed in the active component of the detector.

Additionally, the length of the detection strip, which forms the thermometer of the HEB or of the STF junction, may be at least ten times smaller than that of the meander structure. The problems related to non-uniformity of the width of the superconducting strip and to classical or quantum electronic fluctuations disappear for the most part.

Detection efficiency may therefore attain very high values, noise is weaker and jitter is reduced. Indeed, there is less phase noise and better temperature uniformity in a shorter superconducting strip.

Further, the invention may be applied by existing technological means.

Specifically, the object of the present invention is an optical detector, intended to detect at least one photon (from one to about ten photons), this detector comprising a dielectric substrate and, on this substrate, at least one bolometric detection component which is provided for generating an electric signal from the energy of the received photon(s), this detector being characterized in that it further comprises at least one coupling component which is formed on the substrate, is distinct from the bolometric detection component and comprises a metal element, provided for generating a surface plasmon by interaction with the photon(s) and for guiding this surface plasmon right up to the bolometric detection component which then absorbs the energy of the surface plasmon.

It is specified that the bolometric detection component is a bolometric component which is in thermal equilibrium or out of thermal equilibrium (as for hot electron bolometers).

According to a particular embodiment of the invention, the bolometric detection component forms a thin and short strip.

According to a first particular embodiment of the detector, object of the invention, the bolometric detection component comprises a monolayer of a material which is selected from bolometric materials and superconducting materials.

According to a second particular embodiment, the bolometric detection component comprises a superconducting multilayer forming a tunnel junction and/or a Josephson junction.

The tunnel junction may be a magnetic tunnel junction.

According to a first particular embodiment of the invention, the bolometric detection component and the metal component are substantially rectilinear and the metal component extends longitudinally with the bolometric detection component.

Preferably, in this case, the metal component has a first width and the bolometric detection component has a second width which is smaller than the first width, and the metal component connects to the bolometric detection component through one end.

According to a second particular embodiment of the invention, the bolometric detection component and the metal component are substantially rectilinear and the bolometric detection component is perpendicular to the metal component.

Preferably, generation of the surface plasmon is obtained by coupling in a configuration of the Otto type or Kretschmann type or by coupling by means of a diffraction grating, which is formed on the metal component, or by means of a dielectric waveguide which is formed on the metal component or which is formed between the latter and the substrate and has a refractive index larger than that of the substrate.

The detector, object of the invention, may further comprise an optical fiber for transporting the photon(s) in order to couple them.

The end of the optical fiber may be cleaved along a cleavage angle which allows the surface plasmon to be generated by coupling in the Otto type configuration.

Alternatively, the end of the optical fiber is cleaved along a cleavage angle which allows the surface plasmon to be generated by coupling in the Kretschmann type configuration and the refractive index of the substrate is lower than that of the core of the optical fiber.

According to another alternative, the end of the optical fiber is cleaved along a cleavage angle which allows the surface plasmon to be generated by coupling in the Kretschmann type configuration and the refractive index of the substrate is larger than that of the core of the optical fiber, and a dielectric layer, the refractive index of which is larger than that of the substrate, is provided on the metal component between the latter and the optical fiber.

According to a preferred embodiment of the invention, the metal component of the coupling component forms a guide intended for coupling a focused incident light beam formed by the photon(s), to a long range surface plasmon, this coupling being performed by the section of the guide, at a first end of the latter.

The guide may also be a tapered guide, the second end of which is less wide than the first end.

In this case, the bolometric detection component may be substantially rectilinear, placed facing the second end of the guide and perpendicular to the second end; or at least one portion of the bolometric detection component may be substantially rectilinear, this portion being placed under the second end of the guide, parallel to this second end.

The guide may also be a straight guide for long range surface plasmons, placed between two plasmon mirrors, i.e. two reflecting mirrors (for example in gold or silver), positioned at the input and at the output of the guide and for example deposited on the facets of the chip of the detector. The guide provided with both mirrors thereby forms a plasmon resonator. The bolometric detection component is then substantially rectilinear and placed at least in part under the guide, for example parallel or perpendicular to this guide.

According to a particular embodiment of the invention, the detector comprises an a set of coupling components and a set of bolometric detection components, the whole of the coupling components forming a matrix of components on the substrate and being intended for coupling a collimated incident light beam, formed by the photon(s), this coupling occurring by attenuated total reflection, in the Otto or Kretschmann configuration, and in which each of the detection components forms a bridge which connects two adjacent coupling components.

Preferably, each coupling component forms a resonator along a direction parallel to the plane of incidence of the light beam on the substrate.

Then, preferably, each coupling component further forms a resonator along a direction perpendicular to the plane of incidence of the light beam on the substrate.

According to a preferred embodiment of the detector, object of the invention, each bolometric detection component comprises a superconducting nitride phase. This phase may be niobium nitride.

SHORT DESCRIPTION OF THE DRAWINGS

Figure 1B:
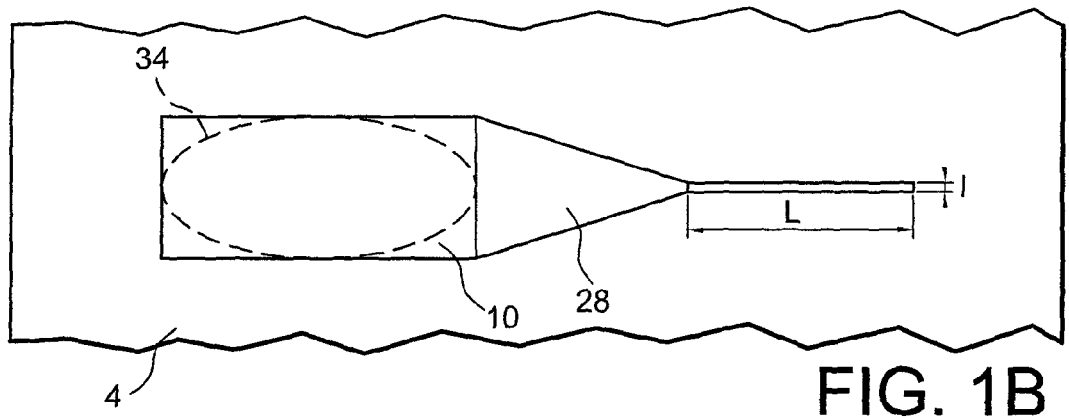
Figure 2:
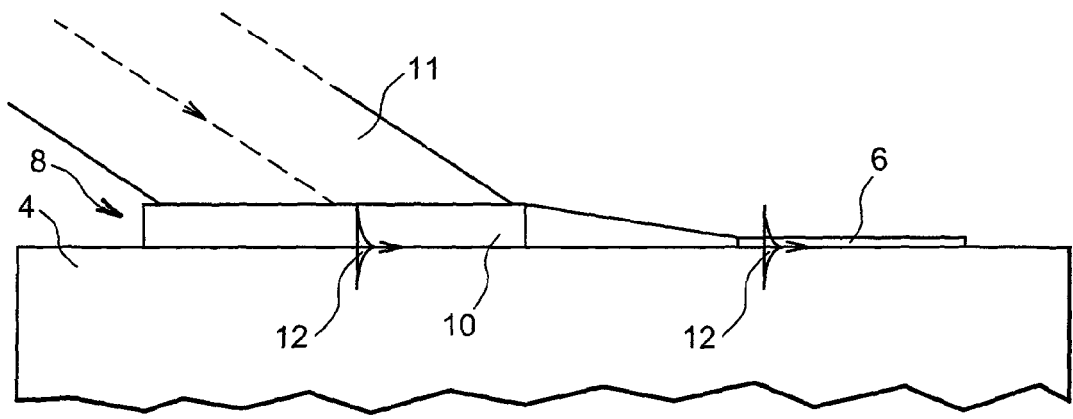
Figure 1C:
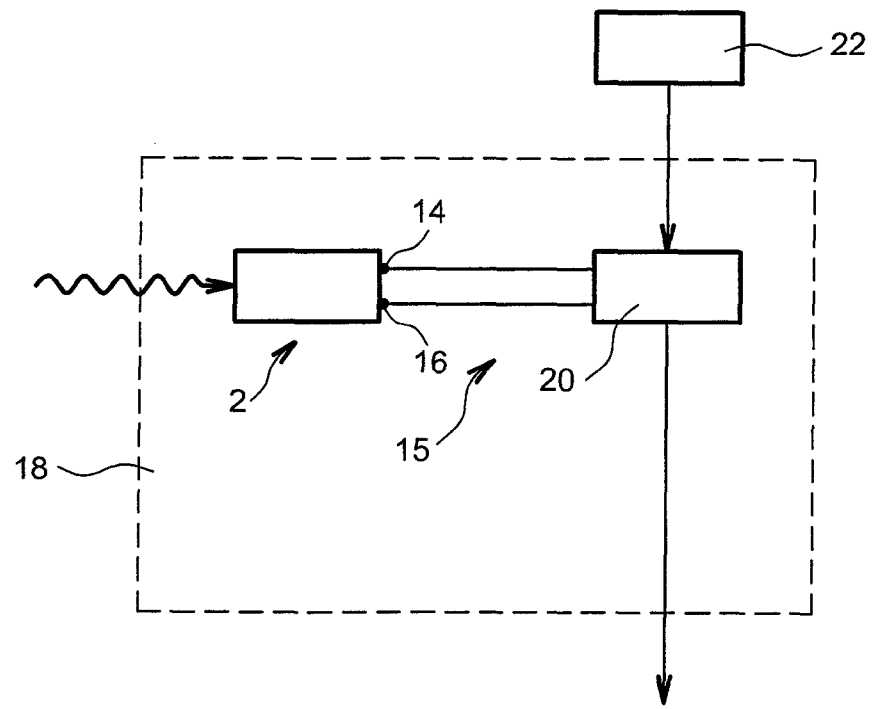
Figure 3:
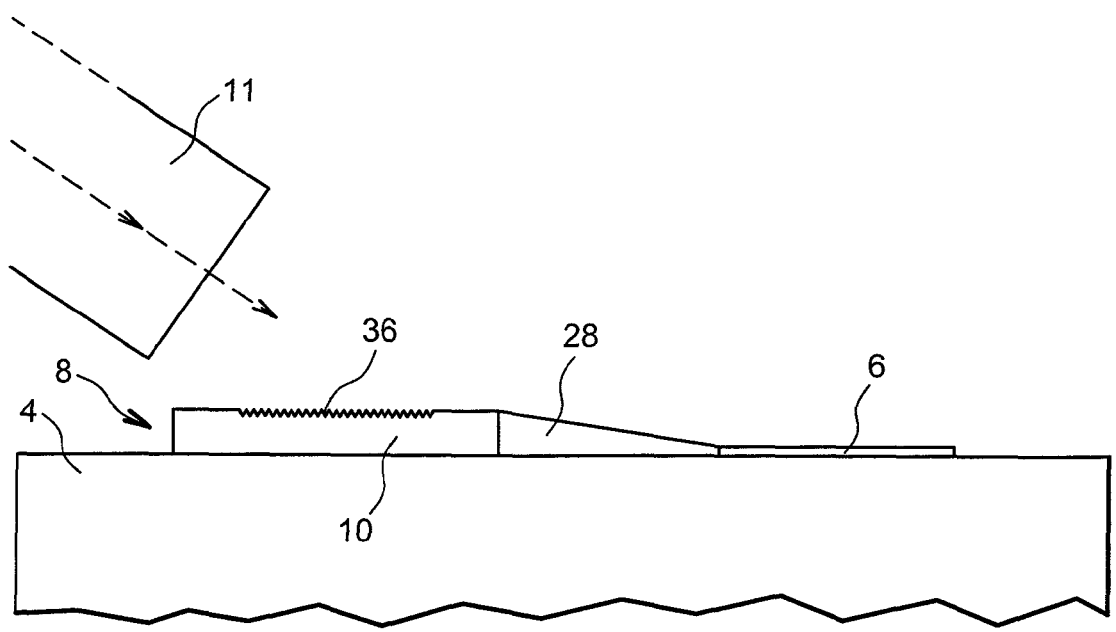
Figure 1D:
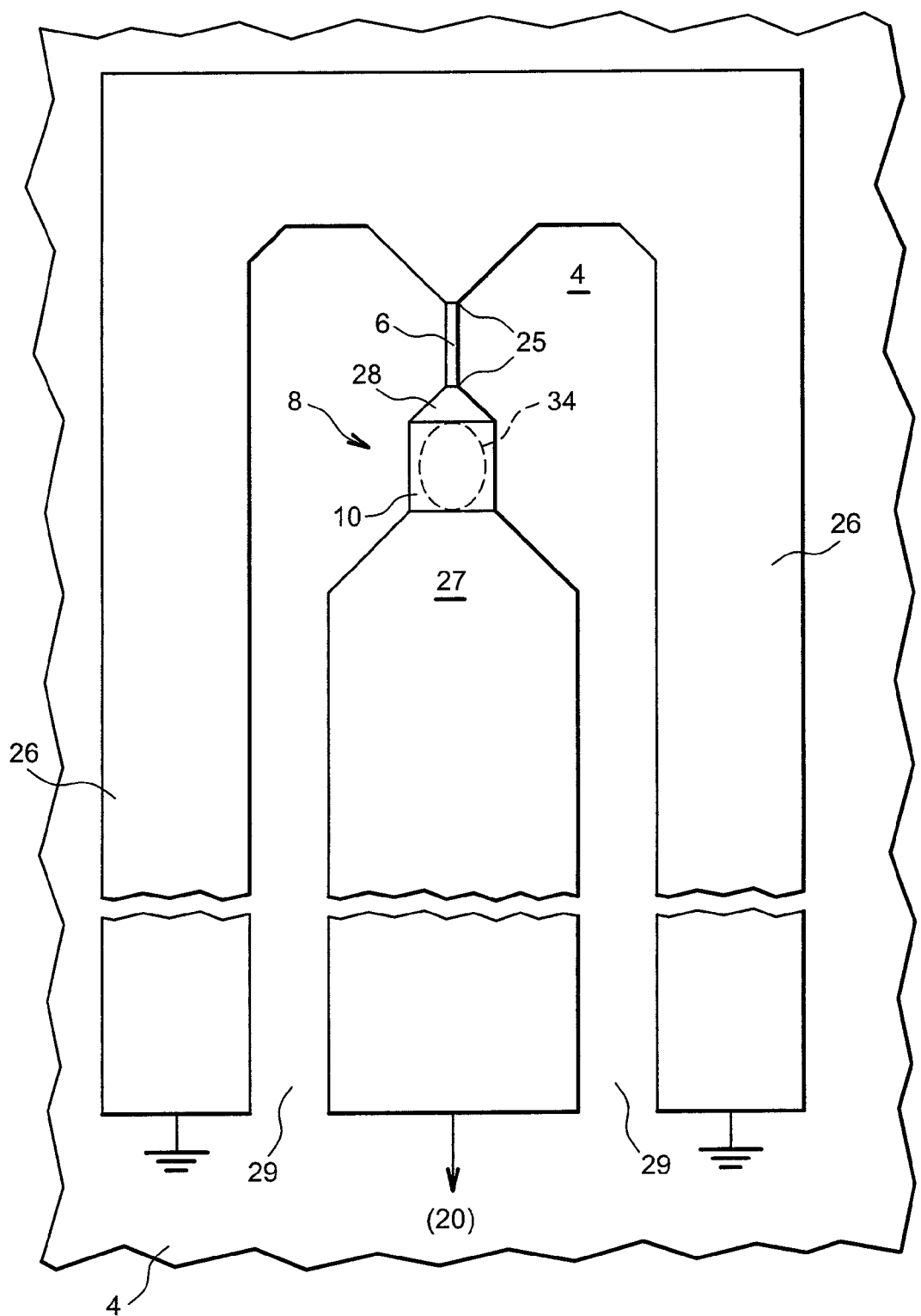
Figure 1E:
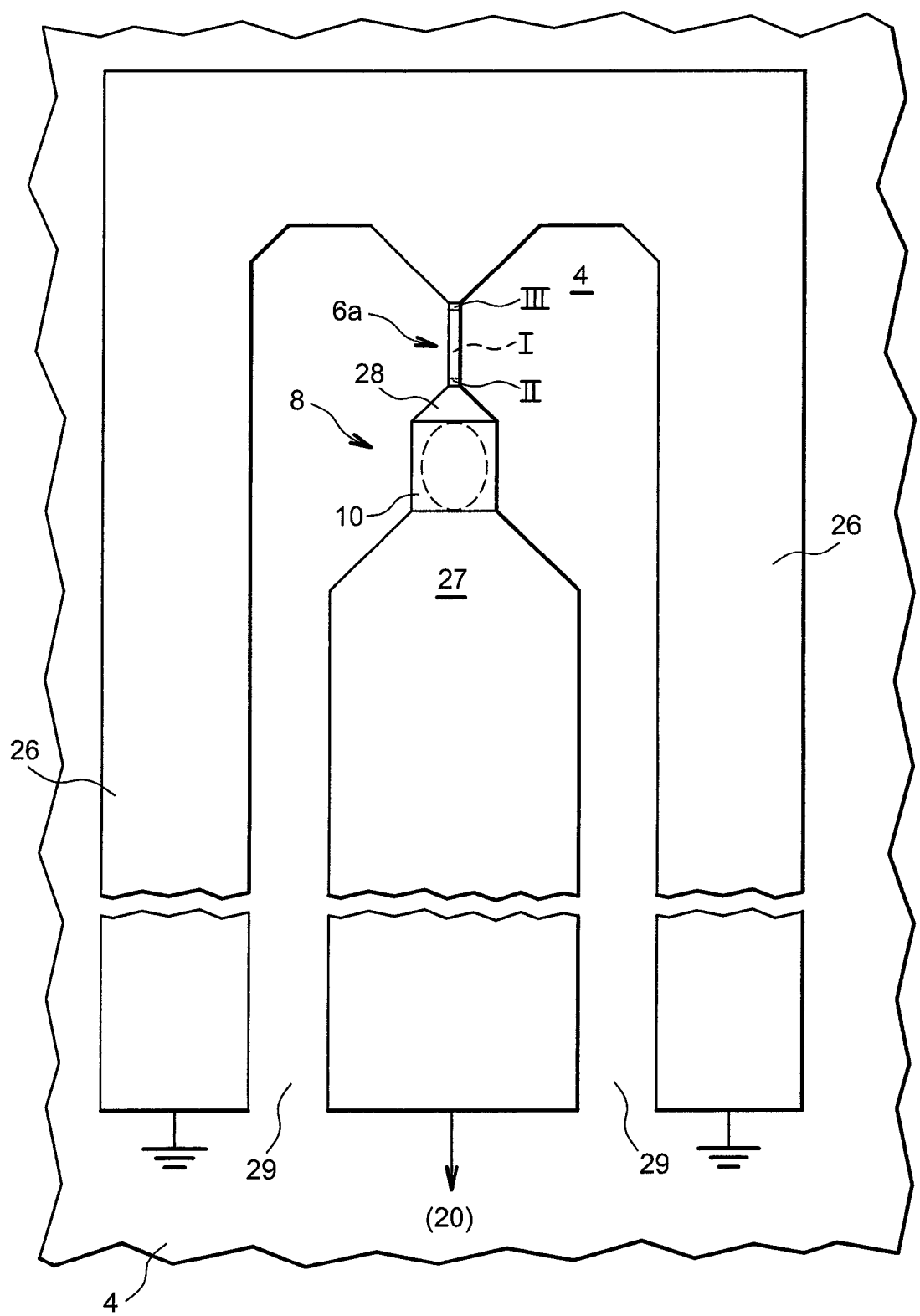
Figure 6A:
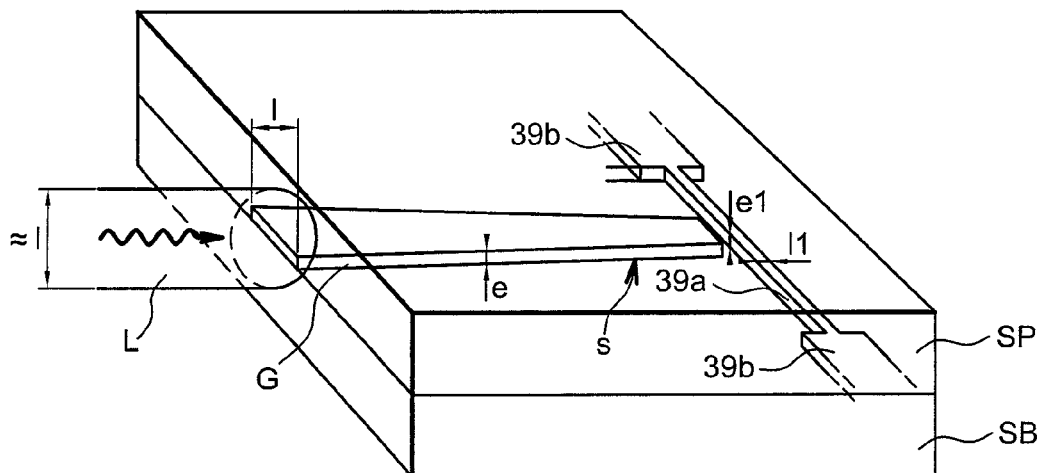
Figure 6B:
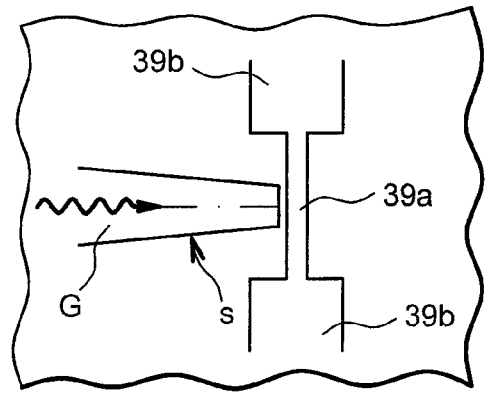
Figure 7:
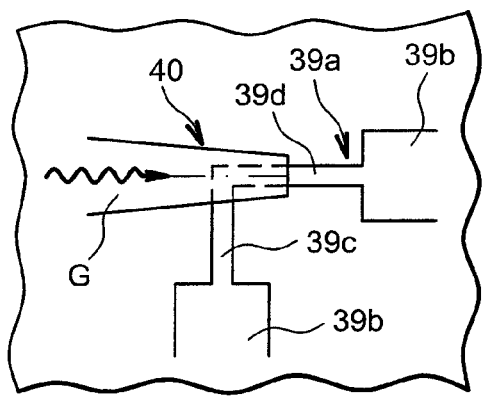
Figure 8A:
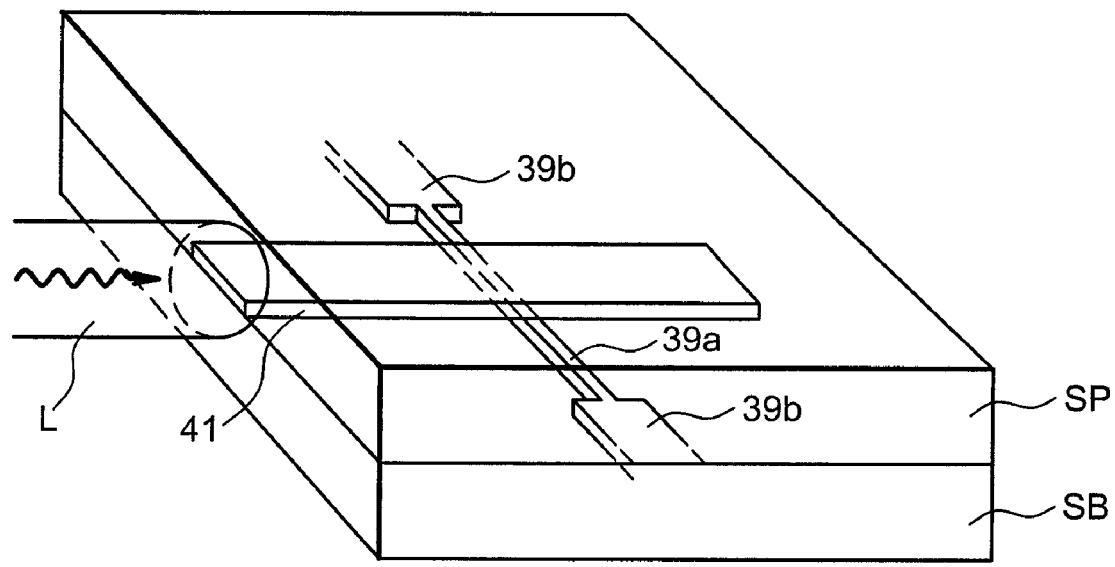
Figure 8B:
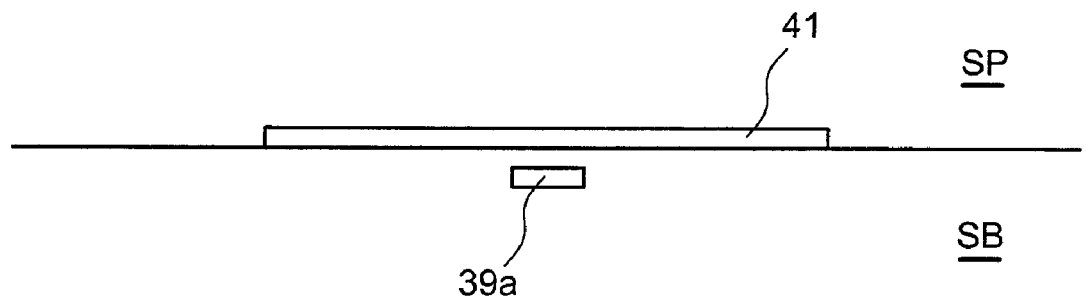
Figure 9A:
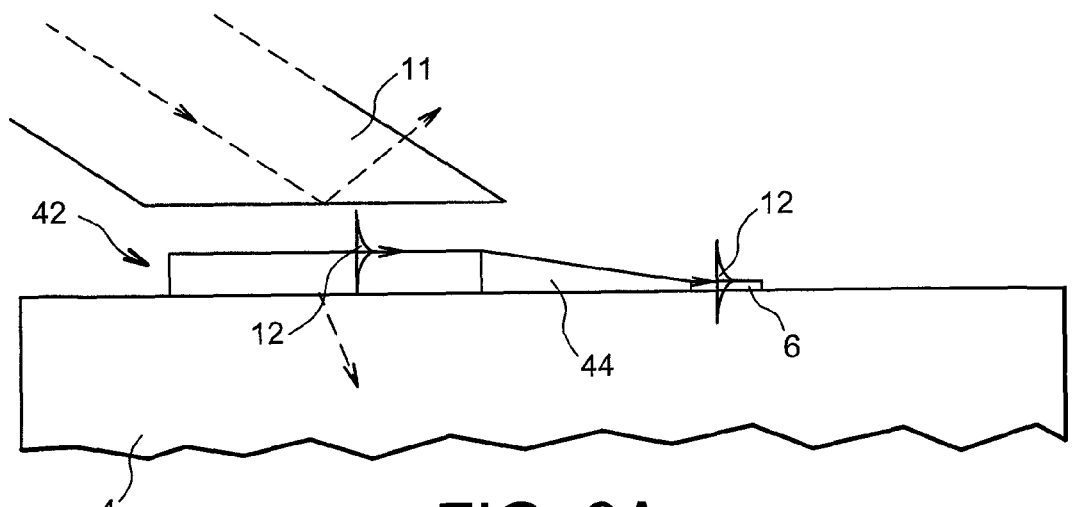
Figure 9B:
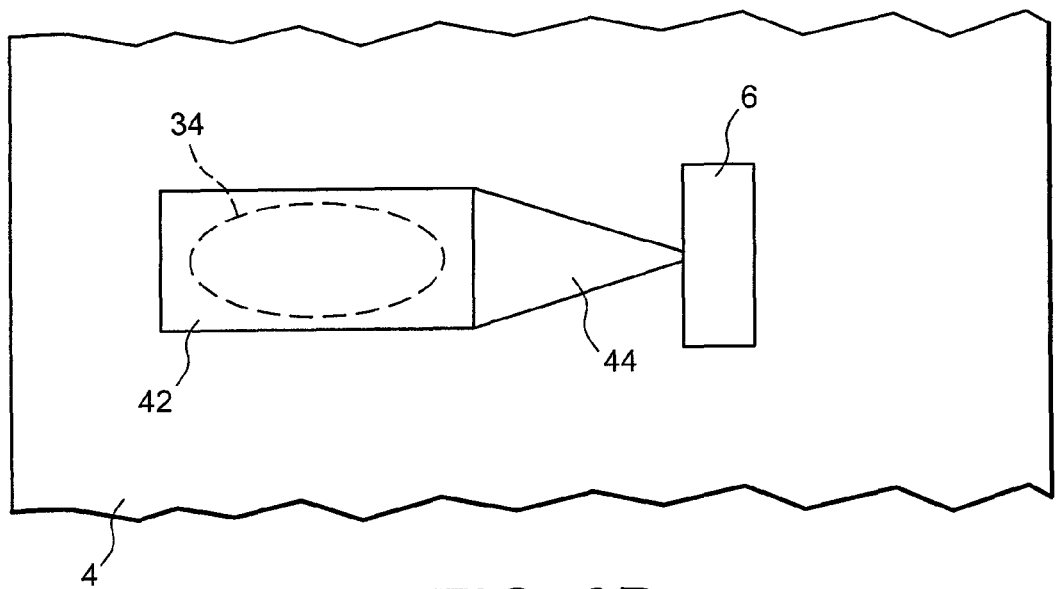
Figure 10A:
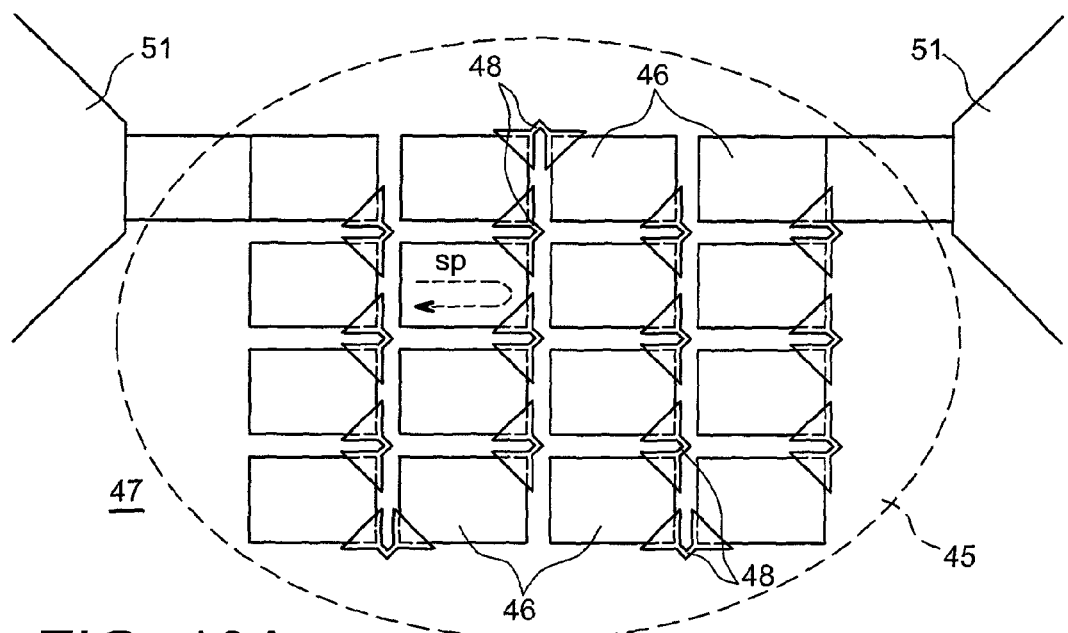
Figure 10B:
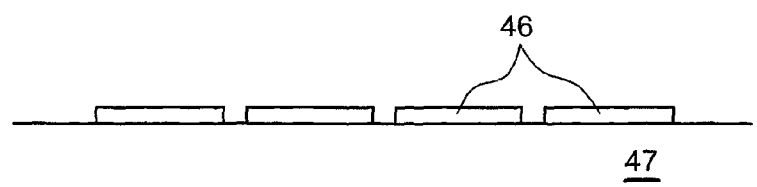
Figure 10C:
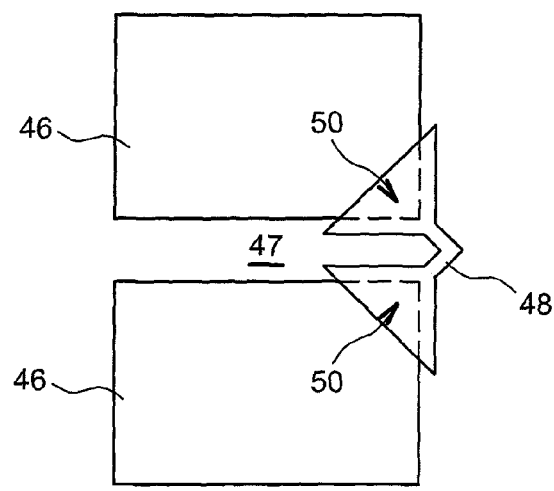

The present invention will be better understood upon reading the description of exemplary embodiments as given hereafter, purely as an indication and by no means as a limitation, by referring to the appended drawings wherein:

FIG. 1A is a schematic longitudinal sectional view of an example of the detector, object of the invention, FIG. 1B is a schematic top view of the detector, object of FIG. 1A, FIG. 1C is a schematic view of the control and treatment means associated with the detector of FIGS. 1A and 1B, FIG. 1D is a schematic top view of another example of the detector, object of the invention, FIG. 1E is a schematic top view of an alternative of FIG. 1D, FIG. 2 is a schematic longitudinal sectional view of another example of the detector, object of the invention, FIG. 3 is a schematic longitudinal sectional view of another example of a detector, object of the invention, FIG. 4A is a schematic longitudinal sectional view of another example of the detector, object of the invention, FIG. 4B is a schematic top view of the detector of FIG. 4A, FIG. 5A is a schematic longitudinal sectional view of another example of the detector, object of the invention, FIG. 5B is a schematic top view of the detector of FIG. 5A, FIG. 6A is a schematic perspective view of a preferred embodiment of the detector, object of the invention, FIG. 6B is a schematic and partial top view of the detector of FIG. 6A, FIG. 7 is a schematic and partial top view of an alternative of this detector of FIG. 6A, FIG. 8A is a schematic perspective view of another embodiment of the invention, FIG. 8B is a schematic and partial top view of the detector of FIG. 8A, FIG. 9A is a schematic longitudinal sectional view of another example of the detector, object of the invention, FIG. 9B is a schematic top view of the detector of FIG. 6A, FIG. 10A is a schematic top view of another detector according to the invention, FIG. 10B is a schematic and partial sectional view of the detector of FIG. 10A, FIG. 10C is a schematic view of two adjacent coupling components of this detector of FIG. 10A, which are connected by a bridge in superconducting material, and FIGS. 11A-11E schematically illustrate steps of a method for manufacturing a component in a superconducting material, used for manufacturing a detector according to the invention.

DETAILED DISCUSSION OF PARTICULAR EMBODIMENTS

Various detectors according to the invention as well as the operation of these detectors, are described hereafter, in the case of a focused incident light beam and then of a collimated incident light beam.

Let us place ourselves first of all within the scope of a focused incident beam, the width of which is typically a few micrometers and which stems from a single-mode optical fiber or from focusing optics such as for example a microscope objective.

A first detector example according to the invention is seen in a longitudinal sectional view in FIG. 1A and in a top view in FIG. 1B.

This detector 2 comprises a dielectric substrate 4 and a bolometric detection component 6 formed on this substrate and made in superconducting material, preferably NbN. This component forms a thin, short and substantially rectilinear strip.

Typically, the thickness E of this strip is less than 10 nm, its width l is less than 1 µm and its length L is less than 100 µm but advantageously larger than the propagation length $\delta_{sp}$ of the plasmon at the surface of the superconducting material, NbN in the example, relatively to air.

In the example, E has the value 4 nm, l has the value 0,2 µm and L has the value 10 µm.

The detector 2 also comprises a coupling component 8 which is formed on the substrate. This component 8 is distinct from the bolometric detection component 6 but is in contact with it. The coupling component 8 includes a substantially rectilinear metal component 10 which is longitudinally extended with the bolometric detection component 6.

The coupling component 8 is provided in order to receive one or a few photons which are intended to be detected, for example a single photon, and to impart the energy of this photon to the bolometric detection component 6. In the example, the photon is brought to the metal component 10 through an optical fiber 11, more specifically through the core (not shown) of this fiber. The bolometric detection component is provided in order to generate an electric signal from the energy of the photon and to allow electrical, fast and distorsionless propagation of the detected signal.

Let us note that the optical fiber 11 is positioned for oblique incidence in the example of FIGS. 1A and 1B.

In this example, the energy of the photon is imparted to the bolometric detection component as a surface plasmon 12: the metal component 10 generates this plasmon by interaction with the photon and guides this plasmon right up to the detection component 6.

Two electrodes (not shown) are respectively formed at both ends of the structure formed with the bolometric detection component 6 and the coupling component 8. Each electrode consists of one or several layers of a suitable metal, for example gold. These electrodes allow the detection component 6 to be connected to control and treatment means 15 which are seen on FIG. 1C, in which these electrodes have references 14 and 16, respectively.

These electrodes have references 26 and 27 in FIG. 1D to which we will refer back subsequently and which is a schematic top view of a detector according to the invention.

In FIG. 1C, a cryostat 18 is seen, provided for maintaining the detector 2 at a temperature much lower than the critical temperature of NbN. Control and treatment means 15 are also seen.

These means 15 comprise a biasing T 20, which is connected to the electrodes 14 and 16 and with which fast detection signals the frequency of which is of the order of 1 GHz, may be separated from the direct current for the power supply of the detector, by means of propagation lines the structure of which is coplanar and the impedance of which is matched (see FIG. 1D).

These means 15 also comprise a source 22 of polarization current which is connected to the T and provided for biasing the detector 2 by a direct current, the intensity of which is less than the critical intensity of the detector. Specific means (not shown) for amplifying or multiplexing signals may be provided in the cryostat.

FIG. 1D is a schematic top view of a particular embodiment of the detector, object of the invention.

This detector still comprises the substrate 4 and, on the latter, two electrically conducting structures 26 and 27. The structure 27 forms a substantially rectilinear strip. It is extended with the coupling component 8 which still comprises the component 10 followed by the area 28.

This area 28 is followed by the rectilinear bolometric detection component 6, the ends of which have reference 25.

The structure 26 extends on either side of the assembly comprising the strip 27, the component 8 and the component 6. Further, as this is seen, this structure 26 is connected to the end of the component 6, opposite to the one which is contact with the area 28.

The structure 26 and the strip 27 thereby delimit two areas 29 of the substrate which are substantially rectilinear and form coplanar lines for the propagation of the detected electric signal.

The structure 26 is grounded.

The strip 27 allows the detector to be biased in current and the detected signal to be outputted towards the biasing T 20 (FIG. 1 C).

The component 6 forms an NbN bridge. Purely indicatively and by no means as a limitation, this NbN bridge has a length of 5 μm, a width of 0.2 μm and a thickness of 4 nm; and the width of the lines 29 has a value of 30 μm.

FIG. 1E forms an alternative of FIG. 1D, to which we will be refer back subsequently.

Let us again consider the example of FIGS. 1A and 1B. The energy borne by the incident wave stemming from the optical fiber 11, the core of which has a diameter which typically has a value of a few micrometers, is confined in two spatial directions before being guided at the surface of the metal component 10.

Indeed, there is vertical confinement: the incident light excites a plasmon mode of the interface between the dielectric 32 and the component 10, the latter forming a metal plasmon guide and the excited plasmon 12 propagates at the interface between the metal and the dielectric which surmounts this metal, i.e. air in the example.

There is also side confinement: the surface plasmon is then guided towards a focusing area 28 where it is subject to side confinement.

In the example, the metal component 10 has a length of the order of 10 μm and a width of the order of 5 μm.

Several configurations are possible for coupling the plasmon.

A first possible configuration (FIG. 1A) is an Otto type coupling, a first alternative of the ATR (Attenuated Total Reflection) technique.

The end 30 of the fiber 11 is cleaved along an angle which allows the guided mode in the fiber to be subject to total reflection on the end 30 and to generate, in a low refractive index layer 32, an evanescent wave which will excite the plasmon mode at the upper interface of the metal of the component 10.

This layer 32 may be a layer of air or a dielectric layer of low index, included between the cleaved end 30 and the component 10.

This low index layer should have an refractive index less than the effective index of the guided mode of the fiber, so as to provide total reflection; its thickness has a typical value of 1 μm.

The cleavage angle of the fiber should be larger than the critical angle $i_c$ of total reflection between the fiber and the dielectric 32. The value of this cleavage angle is determined by the wave vector of the plasmon, which depends on the dielectric constant of the metal of component 10 (for example silver), and by the refractive index of the low index layer.

As regards the selection of the metal of the component 10, the propagation length of the plasmon, which depends on the dielectric constant of the metal of the component 10, and on the index of the dielectric layer 32, should be sufficient, typically a few tens of micrometers, in order to limit losses. This condition is fulfilled by gold and silver, the usual metals in plasmon applications. These low-resistivity metals are also suitable for making electric structures connected to the detector.

The thickness of the metal component or film 10 has a typical value of a few tens of nanometers. It is specified that the thicknesses and the indexes are adjusted in order to optimize coupling, notably in order that the angular width of the resonance covers the angular dispersion of the mode of the fiber.

Provision may also be made for interposing one or several dielectric layers, with suitable optical indexes, between the fiber and the component 10, so as to allow proper optical coupling.

The range of wavelengths which may be contemplated for the detector 2, corresponds to the existence domain of surface plasmons in the relevant metals. For silver and gold, the wavelength should be approximately equal to or larger than 350 nm, and for NbN, it should be approximately equal to or larger than 600 nm. It should be noted that the propagation length of the plasmons is an increasing function of wavelength.

It is specified that the area delimited by an ellipse 34 in FIG. 1B schematically illustrates the intersection of the incident light beam and of the plane of the component 10. Further, the length of the area 28 should be less than the propagation length of the plasmon.

Alternatively, a Kretschmann type coupling may be used (another alternative of the ATR technique) as shown in FIG. 2.

In this case, the cleaved end 30 of the fiber 11 is directly in contact with the metal of the component 10. Therefore, there is total reflection of the light which propagates in the fiber. The evanescent wave excites the plasmon at the lower metal/substrate interface, which is possible provided that the index of the substrate is less than that of the core of the fiber.

This condition is not fulfilled with a sapphire substrate, the index of which has the value 1.75, and with a standard fiber for which the core has an index equal to 1.45. But, interposition of a high index material (an index larger than that of the substrate) may then be contemplated, between the metal component 10 and the cleaved face of the fiber.

In another alternative, which is schematically illustrated by FIG. 3, coupling by means of a diffraction grating is used.

A plasmon is excited from the fiber, which is cleaved perpendicularly to its axis in this case, with normal or oblique incidence on the metal film 10. The incidence is oblique in the example of FIG. 3. A diffraction grating 36 is provided at the surface of the metal component or film 10 and the end of the fiber is placed facing this grating, forming an angle less than or equal to 90° with the latter (see [Ditlbacher 03] concerning coupling by a grating). The characteristics of the grating, i.e. its pitch and its amplitude, are selected so as to optimize the coupling.

Other couplings may be contemplated, according to which the optical fiber is coupled with the detector via the edge of the latter.

In one alternative, a coupling by waveguide is used (see FIGS. 4A-4B and 5A-5B).

The light from the fiber 11 which is cleaved perpendicularly to its axis, is coupled in an amorphous dielectric guide waveguide 38, which is formed on the metal component 10. The evanescent wave which propagates at the lower interface of the waveguide 38 is coupled to the plasmon mode at the lower metal interface, provided that the effective index of the guided mode is larger than the index of the substrate.

This is schematically illustrated by FIG. 4A, in which the detector of the relevant example is seen in a longitudinal sectional view, and by FIG. 4B, in which it is seen from the top. It is seen that the waveguide 38 also extends above the bolometric detection component 6 and that its width is substantially equal to that of the metal component 10.

Alternatively, the metal component 10 and NbN may be deposited over the dielectric waveguide 38, the index of which should then be larger than the one of the substrate 4. This is schematically illustrated in a longitudinal sectional view in FIG. 5A and in a top view in FIG. 5B. For example, the guide may be formed by ion implantation in an $Al_2O_3$ or MgO substrate. A $LiNbO_3$ ridge waveguide may also be used, which is formed on the substrate. It is known that epitaxy of $LiNbO_3$ films on $Al_2O_3$ and MgO is possible.

As regards the guiding and focusing of the plasmon, a propagation over several tens of micrometers, with excellent side confinement, as well as focusing by a triangular termination, were obtained on silver (see [Weeber 01]), and gold (see [Krenn 02]) waveguides with a width of a few micrometers.

Another example of edge coupling is schematically illustrated in FIG. 6A which corresponds to a preferred embodiment in the case of a focused incident light beam. Indeed, the angular divergence of this beam is significant, which makes the aforementioned coupling techniques (with oblique incidence) limited.

More specifically, the diffraction-limited beam (the most favorable case) typically has a width of a few micrometers and this beam stems from a single mode optical fiber or focusing optics, for example a microscope objective. The angular divergence is significant (11° for the total angle at 1.55 μm), which makes the traditional ATR coupling techniques in an Otto or Kretschmann configuration or coupling techniques via a grating, not very suitable for coupling light to a surface plasmon, for which the angular resonance is fine and ranges typically from 0.1° to 1°.

In order to solve this problem, a solution consists of coupling light L (FIG. 6A) from the optical fiber (not shown) by the edge (coupling of the end-fire coupling type) of a metal guide G to the long range propagation mode or LRSP (long range surface plasmon) mode, which in particular exists for a very thin guide (its thickness e ranging from 5 to 10 nm) in a symmetrical structure, for which the substrate SB and the superstrate SP have the same index (see document [Nikolajsen 04]). The polarization of the light beam to be detected should be of the TM type, i.e. perpendicular to the guide G.

This mode has the particularity of having a large spatial extension, and a field profile which is compatible with those of a single mode optical fiber for a guide section e x l typically equal to (5 nm-10 nm)×(5 μm-10 μm). This metal guide G plays the role of a «rail» which guides the light without strongly confining it.

The coupling losses mentioned in the document [Nikolajsen 04] are limited to 10%, and they may be reduced by filling the space comprised between the fiber and the guide with a medium having an optical index close to that of the substrate, in order to limit back reflection.

The metal guide G is made in a noble metal, for example silver or gold, metals which have low extinction coefficient, therefore low dissipation losses, which allows large propagation distances.

It should be noted that the distance between the fiber and the guide should be less than Rayleigh's distance equal to 50 μm for a single mode fiber at 1.55 μm.

The LRSP mode is then confined in a submicron section s of the tapered guide which forms the metal guide G, by means of low angle tapering, which achieves an adiabatic transition (therefore without any or almost any losses) from the LRSP towards a localized surface plasmon ([Stockman 04]).

The tapered guide G is relatively long (several hundreds of micrometers). At its output end, the energy density is very large because of the very strong confinement of the field at least in the plane of the metal layer forming the guide, and may be up to 1,000 times larger than the density existing at the input of the guide ([Stockman 04]). This intensification of the field is of interest for efficiently transferring the energy to the absorbing material (for example NbN) of the bolometric detection component 39a forming a rectilinear strip, the section of which e1×l1 is also very small and has a typical value of (4 nm)×(100-200 nm).

In FIGS. 6A and 6B, the contacts 39b which are provided at the ends of the strip 39a, are also seen.

If the output end of the tapered guide is wider than the thickness of this guide, the polarization remains of the TM type all along the guide. A localized plasmon mode of the NbN strip 39a which is placed in proximity to the output end of the guide G, perpendicularly to this guide ([Weeber 99]) may thereby be excited. The length of this strip 39a forming a nanowire is sufficiently large to absorb the plasmon (in NbN, a length of about ten micrometers at a wavelength of 1.55 μm may be selected), or is set to a multiple of half the wavelength of the plasmon ([Schider 03]), so as to form a resonant and simultaneously absorbing antenna.

Such a structure may be made by successively depositing on the substrate, the guide, a very fine layer of dielectric material and then the NbN strip. Other techniques may be contemplated, and for example those based on hybridization.

The NbN strip 39a may also be positioned under the output end 40 of the guide G, parallel to this guide (FIG. 7). The absorbing material (NbN in the example) absorbs the evanescent wave which circulates in proximity to the guide. By using a tapered guide, it is possible to increase the field and therefore to reduce the required length of NbN.

Let us note that in the example of FIG. 7, the strip 39a is in two portions 39c and 39d which are perpendicular to each other, and only the portion 39d is parallel to the guide G.

Instead of a tapered guide, another solution consists of using a straight LRSP guide placed between two mirrors as a resonator (FIGS. 8A and 8B). Both mirrors (not shown) are two reflecting mirrors, for example in gold or silver, positioned at the input or at the output of the guide and for example deposited on the facets of the chip of the detector. The length of this straight guide 41 is a multiple of half the wavelength of the LRSP, itself very close to the wavelength in vacuo of the detected light. The rectilinear strip 39a of NbN is placed at least partly under the guide 41, for example perpendicularly to this guide. The LRSP is subject to multiple round trips in the cavity and it is partly absorbed in the NbN at each passage.

By using an LRSP mode, it is possible to avoid losses by dissipation in the metal. This solution requires specific control of the dimensions, so that the structure resonates at a given wavelength.

As an example, various numerical values relating to a detector according to the invention are given hereafter:

thickness of the coupling component 8: typically 10 nm, possibly a few nanometers like the supra-conducting strip 6;

width of the coupling component: a few micrometers, a width well adapted to the dimensions of an optical fiber;

length of the coupling component: much smaller than the propagation distance of the plasmon;

output section of the focusing tip 28: substantially identical to that of the superconducting strip 6 (a few tens of micrometers per a few nanometers);

length of the focusing tip 28: also less than the propagation distance of the plasmon; the shape of this focusing tip (a triangular shape or another shape) is optimized so as to minimize losses.

Specifications are given hereafter on the guiding, absorption and detection in the superconducting strip 6.

This superconducting strip is a plasmon guide with absorption losses. Several configurations are possible:

a superconducting nanoguide aligned with the guide, or metal component 8 (see [Dickson 00] for gold or silver nanoguides): this configuration corresponds to the examples of FIGS. 1A-1B, 2, 3, 4A-4B and 5A-5B; light propagates in the NbN strip in a guided plasmon mode, at the NbN/air or NbN/substrate interface, depending on the coupling used; the length of this nanoguide should be larger than the characteristic propagation length of the plasmon at the interface between NbN and air or a dielectric of low index, a length which is of the order of 5 μm to 10 μm;

an NbN nanoguide perpendicular to the metal guide or component: the NbN strip then behaves as a nanowire which guides the light and which is struck by a polarization parallel to its axis [Weeber 99], according to a localized plasmon type process; the length of the nanoguide is then larger than the propagation length; an exemplary detector corresponding to such a configuration, is schematically illustrated by FIG. 9A (seen in a longitudinal sectional view) and by FIG. 9B (top view); the NbN strip 6, the metal component 42 provided with a focusing area 44 through which the component 42 connects to the strip 6 and the substrate 4 on which the detector is formed, are seen therein.

Detection of the energy borne by the plasmon in the superconductor may be accomplished:

either according to the principle of a hot electron bolometer with a threshold, the bolometer then being biased by a sub-critical current (see [Korneev 04]); this case corresponds to the example of FIG. 1C;

or by a superconducting tunnel junction according to the principle of superconductor-insulator-superconductor receivers (SIS), by suppressing the Josephson current by means of a magnetic field; this case is schematically illustrated by the example of FIG. 1E which is a schematic and partial top view of an alternative of FIG. 1D; the superconductor may for example be NbN and the insulator, MgO or a tantalum nitride, the thickness of which has the typical value of 1 nm; in the example of FIG. 1E, the bridge 6 is thus replaced with a Josephson tunnel junction 6a which is for example of the NbN—MgO—NbN type; the layer I of MgO is then comprised between both layers II and III of NbN; one (II) of both of these NbN layers is electrically connected to the area 28 and the other NbN layer (III) is connected to the structure 26;

or by detection of the Josephson current of a superconducting junction or a SQUID (Superconducting Quantum Interference Device).

Materials other than superconductors may be contemplated for the detection: a bolometric material, for example a manganite or a cuprate, or even a semiconducting material for which the gap (forbidden bandwidth) is matched to the wavelength of the photon to be detected, may be used.

In addition, the bolometric detection component may consist of a single layer of the relevant material (for example in the case of bolometers) or consist of a multilayer (in the case of a superconducting tunnel junction and/or a Josephson junction or a magnetic tunnel junction).

The case of a collimated incident light beam is considered in the following.

With a collimated beam, the width of which has a value of at least 100 μm, the angular divergence is reduced to less than 1° and an effective coupling of the light towards a surface plasmon may be contemplated via a traditional coupling technique by attenuated total reflection (ATR), in the Otto or Kretschmann configuration, for planar metal layers. The beam is then in an oblique incidence above the structure.

However, with a beam, the width of which has typically a value of 100 μm, it is not possible to achieve effective coupling towards an LRSP mode, the angular resonance of which is extremely fine. The light may only be effectively coupled towards modes which are confined at a single metal interface, i.e. an upper interface or a lower interface (Otto/Kretschmann); now these modes are attenuated over characteristic distances which are less than 100 μm. Under these conditions, the energy cannot be transferred to the absorbing component.

As this is shown in FIGS. 10A and 10B, it is then possible to contemplate fragmentation of the noble metal (for example Au or Ag) area covered by the beam to be detected 45, into multiple coupling components 46 forming a matrix on the substrate 47. Further, two contiguous components 45 are connected by a wire-like NbN bridge 48 which is supported on two NbN/metal junctions, each having an area of the order of 1 μm², and which absorbs the energy of the plasmon.

FIG. 10C is an enlarged view of one of the NbN bridges 48, which connects two components or cells 46. Both corresponding NbN/metal junctions have reference 50 for this figure.

As the energy transfer from a metal cell 46 towards an associated wire-like NbN bridge is not optimized because of the absence of a tapered guide, the length of the cell in the direction of the incident beam (or, more specifically, parallel to the plane of incidence of the beam on the substrate bearing the matrix, this plane being located by line I), needs to be selected in order that this cell be a resonator, and this length should therefore be given a value equal to a multiple of λ/2, where λ represents the wavelength of the beam, while giving to this length a value significantly less than the propagation distance of the plasmon in the metal of the cell.

At each passage of the plasmon sp at the end of the cell, energy is transferred to NbN as a localized plasmon which is attenuated very rapidly, after a few micrometers, or is simply absorbed by NbN which is an absorbing material.

The width of the cell is also a multiple of λ/2 so that the cell also resonates in the direction perpendicular to the previous one (more specifically perpendicular to the plane of incidence of the beam), in order to effectively collect the energy, in order to take into account the angular width of the beam also in this direction, even if this width is reduced.

From an electrical point of view, all the cells 46 of a same column of the matrix may be connected in series and crossed by the same biasing current. Such a configuration is used in the example of FIG. 10A, where two contacts 51 are further seen, which are respectively formed at both ends of the thereby obtained circuit. However, other electrical configurations are conceivable. The cumulative length of NbN is very short (a few micrometers, because the space between two cells is very small, less than 1 µm.

In the following, indications are given on a method for manufacturing a single-photon monolithic detector including the layers and structures which provide photogeneration of a surface plasmon, propagation of the latter and detection of this plasmon by an NbN component of the HEB type.

The steps of the method for manufacturing such an HEB superconducting bolometric detector in NbN are given hereafter.

Reference may also be made to document [Romestain 2004].

1. Preparation of the support, or substrate, in order to deposit the very thin layer of the superconductor (NbN) thereon and make the structure of the detector thereon.

A corundum or sapphire monocrystalline substrate is typically used, for which the crystalline orientation is preferably an R-plane ($1\bar{1}02$). The face on which the deposit of the layers of the bolometer will be carried out, has an epitaxial quality polish, adapted to epitaxy of silicon. A SOS substrate may also be used, for which the diameter typically has a value of about 75 mm. This diameter may range up to 300 mm. Various surfaces and shapes of the substrate are also possible.

One proceeds with cleaning the surface of the substrate, typically by immersion of the latter in an acetone bath and then in an alcohol bath, and then by exposing it to ultrasound.

Alternatively, one proceeds with a high temperature surface treatment of the substrate, this temperature typically being above 1,000° C., in order to reconstruct the crystalline property of its surface.

Other monocrystalline substrates may be used, for example monocrystalline lamellae of oxides for which the crystal unit cell does not have a too strong parameter divergence with that of the Nbn layer for which the unit cell parameter a has a value of about 0.44 nm. Cubic phase oxide monocrystalline lamellae of the NaCl or B1 type, may for example be used such as MgO (a about 0.42 nm), or $LaAlO_3$ or $ZrO_2$—$Y_2O_3$ substrates.

Monocrystalline substrates of fluorides such as $CaF_2$ for example, may also be used. Lamellae made with semiconductors such as silicon or germanium, or SOI structures may also be used. However, the use of semiconducting substrates such as silicon requires carrying out a combination of specific ex situ and in situ surface treatments before performing the following step.

2. Deposit of the very thin active layer of the detector in niobium nitride by cathodic sputtering.

The NbN superconducting layer with a thickness of a few nanometers and reproducible superconducting properties (critical temperature of the order of 10 K, or above 10 K, for a thickness of about 3.5 nm), and forming the critical component of the detector, may be obtained by continuous magnetron cathodic sputtering of a niobium target with a high purity level (>99.99%), in a mixture of argon and nitrogen, when the substrate (of the R-plane-sapphire type or another type according to the criteria defined in paragraph 1) is uniformly brought to a temperature of the order of 600° C. during the deposition. For the deposition conditions as well as the procedure for nitridation of the niobium target, reference will be made to [Villégier 01].

With a step for degassing the sputtering chamber, it is possible to obtain the vacuum quality required for the deposition. It should be noted that the target material is preferably niobium but other alternatives described in the literature allow other fine superconducting layers to be stabilized, for example of niobium, TiN, MoN or YBaCuO.

A passivating surface layer (in the present case, a very thin layer of amorphous aluminium nitride) is deposited on the nitride layer so that the electrical, physico-chemical, mechanical and optical properties of the very thin niobium nitride layer are not subsequently altered by the formation of a fine native or/and thermal oxide (hydroxide or/and carboxide) layer. On this matter, reference will be made to document [Romestain 2004].

3. Lithography of the HEB—NbN nano-bridge (a size of about 10 µm×100 nm×4 nm) by electronic insolation.

A positive or negative resist is used, which is sensitive to electrons. The thickness of this resist may range from 50 nm to 500 nm, but depends on the nature of the resist. A resist which disappears after development in the areas insolated by the electrons may be used. In this case, the shape to be cut out is inscribed in the resist and this shape is then cut out in the very thin NbN layer by means of RIE (i.e. reactive ion etching), with a gas of the $SF_6$ type. The remaining resist layer is then removed by the same technique, by means of an oxygen plasma (varnish removal).

Alternatively, inverse polarity electronic lithography may be used. The NbN bridge and the contact pads are then described by electron insolation which hardens the resist.

Taking the example of FIG. 1D, the NbN bridge corresponds to reference 6 in this figure. The contact pads correspond to reference 2 in this figure and are used for connecting the ground structure 26, the signal propagation structure 27 and the optical coupling structure 8.

According to another alternative, optical lithography by means of deep ultraviolet radiation, i.e. a radiation for which the wavelength is less than 0.3 µm, is used. With such a lithography, it is also possible to obtain the desired bridge size.

According to another alternative, an NbN nanobridge is formed by NbN anodization under the tip of an atomic force microscope.

An exemplary method is schematically illustrated by FIGS. 11A-11E.

An NbN layer 60 is first formed on a substrate 62 in R-plane sapphire. To do this, epitaxial deposition of NbN by continuous cathodic sputtering at 600° C. (FIG. 11A) is performed.

Figure 11A:
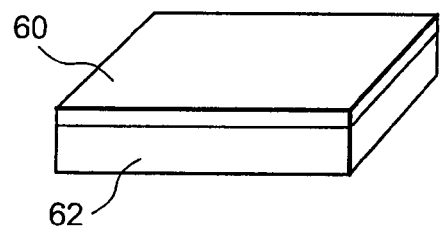
Figure 11B:
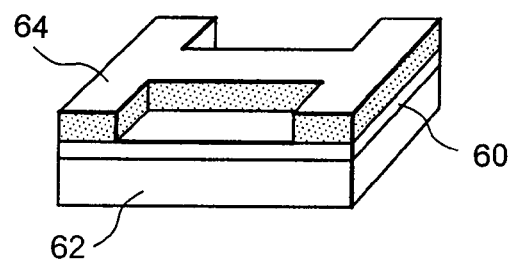
Figure 11C:
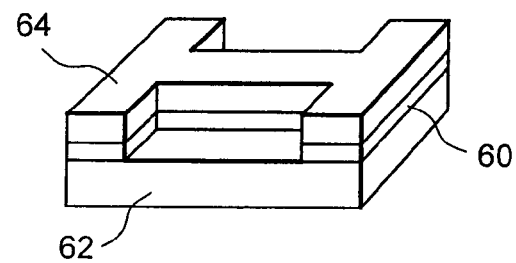

A positive electronic resist layer 64 is then deposited on the NbN layer 62 (FIG. 11B). Next, this layer 64 is etched by a beam of electrons in order to define the desired shape for the NbN component used in the detector.

Fluorinated reactive ion etching of NbN (FIG. 11C) is then carried out.

Figure 11D:
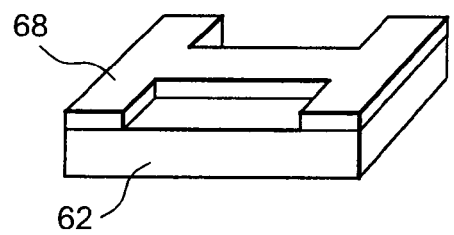
Figure 11E:
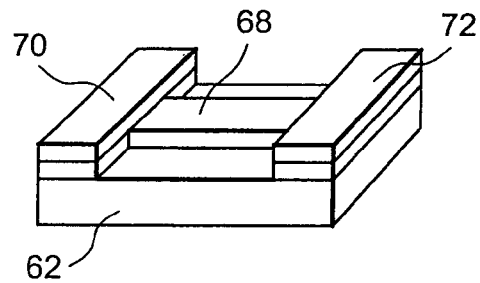

Next, the remaining resist is removed by means of oxygen plasma (FIG. 11D).

The desired NbN component 68 is thus obtained on the substrate 62.

Gold contacts 70 and 72 (FIG. 11E) are then deposited at both ends of this component by a lift-off technique, by immersion in a solvent, for example acetone.

4. Formation of the structure for generating the surface plasmon, for direct current biasing and co-planar propagation of the detected signal by means of deposition(s) of gold or suitable alloy layer(s), through a lift-off mask.

This step consists of bringing one or several structured gold layers onto the NbN layer in a suitable way. These layers will be used for absorbing the photon converted into a plasmon, for its propagation and for electronically applying the detector. With successive depositions of layers with suitable thicknesses, the coupling and the propagation of the plasmon may be improved.

Further, one proceeds with inspecting the critical components of the HEB detector in NbN. The main parameters of the layers and structures resulting from the applied method are estimated by means of physico-chemical characterization and measurement tools, of the kind used in microelectronics, notably for making measurements of nanometric thicknesses by means of grazing X rays or X-ray diffraction.

A detector according to the invention is not limited to the detection of a single photon: with such a detector, it is possible to detect up to about ten photons.

Further, in the present invention, NbN thicknesses larger than those which are given in the examples may be used. Further, superconductors other than NbN may be used, for example other phases of superconducting nitrides, or even high temperature superconducting cuprate phases. As an example, MoN, TaN, TiN, VN, $MgB_2$, $YBa_2Cu_3O_{7-x}$, $ReBa_2Cu_3O_{7-x}$, TiNNb, MoGe, MoRe, NbSi and HgBaCaCuO may be mentioned.

More generally, as this has already be mentioned, materials other than superconductors may be used. Indeed, any material capable of detecting low light energy and restoring an electrical signal corresponding to this energy, may be used, for example a bolometric material or a semiconducting material.

This material may appear as a single-layer or be used in a constitutive stack of a tunnel and/or Josephson junction, this stack for example being of the NbN/MgO/NbN or NbN/MgO/NbN or manganite/barrier layer/manganite type, or even of the ferromagnetic metal/barrier layer/ferromagnetic metal type.

The cited documents in the present description are the following:

[FR 2812455] FR 2812455 A, invention of R. Sobolewski et al. (Schlumberger and Rochester University, 2/2002)

[Dickson 00] R. M. Dickson et al., "Unidirectional plasmon propagation in metallic nanowires", J. Phys. Chem. B104, 6095 (2000)

[Ditlbacher 03] H. Ditlbacher et al., "Efficiency of local light-plasmon coupling", Appl. Phys. Lett. 83, 3665 (2003)

[Gol'tsman 03] Gol'tsman et al., "Fabrication of Nanostructured Superconducting Single Photon Detectors", IEEE Transactions on Applied Superconductivity, 13(2), 192, June 2003

[JPL 03] D. Jackson, J. Stem, "High bandwidth, improved quantum efficiency detector development for multi—GHz class OKD throughput", Jet Propulsion Laboratory, California Institute of Technology, Single Photon Detector Workshop, NIST Gaithersburg, 4/2003

[Korneev 03] A. Korneev et al., "GHz counting rate NbN single-photon detector for IR diagnostics of VLSI CMOS circuits", Microelectronics Engineering 69, 274 (2003)

[Korneev 04] A. Korneev et al., "Sensitivity and gigahertz counting performance of NbN superconducting single-photon detectors", Appl. Phys. Lett. 84, 5338 (2004)

[Krenn $O_2$] J. R. Krenn et al., "Non-diffraction limited light transport by gold nanowires", Europhysics Letters, 60, 663 (2002)

[LeCoupanec 03] P. LeCoupanec, W. K. Lo, K. R. Wilsher, "An ultra-low dark count and jitter, superconducting, single-photon detector for emission timing analysis of integrated circuits", Microelectronics Reliability", 43 (2003), 1621

[S. J. McNab 03] S. J. McNab et al., "Ultra-low loss photonic integrated circuit with membrane-type photonic crystal waveguides", Optics Express 11(22), 2927 (2003)

[Nikolajsen 04] T. Nikolajsen et al., <<Polymer-based surface-plasmon-polariton stripe waveguides at telecommunications wavelengths >>, ppl. Phys. Lett. 82, 668 (2004)

[Romestain 2004] R. Romestain et al., <<Fabrication of superconducting niobium nitride hot electron bolometer for single photon counting >>, New Journal of Physics, 6, 129, 2004

[Schider 03] G. Schider et al., <<Plasmon dispersion relation of Au and Ag nanowires >>, Phys. Rev. B 68; 155427 (2003)

[Stockman 04] M. I. Stockman, "Nanofusing of optical energy in tapered plasmonic wageguides", Phys. Rev. Lett. 93, 137404 (2004)

[Verevkin 03] A. Verevkin et al., "GHz-Rate Superconducting Photon Counting Detector", Single Photon Detector Workshop, NIST Gaithersburg, 4/2003

[Villégier 01] J. C. Villégier et al., IEEE Transactions on applied superconductivity 11 (2001), 68

[Weeber 99] J. C. Weeber et al., "Plasmon polaritons of metallic nanowires for controlling submicron propagation of light", Phys. Rev. B 60 (12),

[Weeber 01] J. C. Weeber et al., "Near-field observation of surface plasmon polariton propagation on thin metal stripes", Phys. Rev. B 64, 045411 (2001)

The invention claimed is:

1. An optical detector configured to detect at least one photon, comprising:
 a dielectric substrate and, on the substrate, at least one bolometric detection component configured to generate an electrical signal from energy of received photon(s);
 at least one coupling component formed on the substrate, which is distinct from the bolometric detection component and comprises a metal component which is a coupling and guiding component, configured to generate a surface plasmon by interaction with the photon(s) and to guide the surface plasmon right up to the bolometric detection component, which then absorbs energy of the surface plasmon,
 wherein a thickness of the coupling component is greater than a thickness of the bolometric detection component, a width of the coupling component is greater than a width of the bolometric detection component, and the coupling component has an end adjacent to the bolometric detection component that tapers in a thickness direction and a width direction so that the wider and thicker coupling component is coupled to the bolometric detection component; and
 a dielectric waveguide disposed on the metal component or formed between the metal component and the substrate, and said dielectric waveguide having a refractive index larger than that of the substrate.

2. The detector according to claim 1, wherein the bolometric detection component forms a strip whose thickness is less than 10 nm and whose length is less than 100 µm.

3. The detector according to claim 1, wherein the bolometric detection component comprises a single layer of a material selected from bolometric materials and superconducting materials.

4. The detector according to claim 1, wherein the bolometric detection component comprises a superconducting multilayer forming a tunnel junction and/or a Josephson junction.

5. The detector according to claim 4, wherein the tunnel junction is a magnetic tunnel junction.

6. The detector according to claim 1, wherein the bolometric detection component and the metal component are substantially rectilinear and the metal component is longitudinally extended by the bolometric detection component.

7. The detector according to claim 1, wherein the bolometric detection component and the metal component are substantially rectilinear and the bolometric detection component is perpendicular to the metal component.

8. The detector according to claim 1, further comprising an optical fiber to transport the photon(s) to couple the photon(s) to the at least one coupling component.

9. The detector according to claim 1, wherein each bolometric detection component comprises a superconducting nitride phase.

10. The detector according to claim 9, wherein the superconducting nitride phase is niobium nitride.

11. The detector according to claim 1, wherein the dielectric waveguide extends above the bolometric detection component.

12. The detector according to claim 1, wherein the dielectric waveguide is formed on the metal component.

13. The detector according to claim 1, wherein the dielectric waveguide is formed between the metal component and the substrate.

14. An optical detector configured to detect at least one photon, comprising:

a dielectric substrate and, on the substrate, at least one bolometric detection component configured to generate an electrical signal from energy of received photon(s); and at least one coupling component formed on the substrate, which is distinct from the bolometric detection component and comprises a metal component which is a coupling and guiding component, configured to generate a surface plasmon by interaction with the photon(s) and to guide the surface plasmon right up to the bolometric detection component, which then absorbs energy of the surface plasmon, wherein a thickness of the coupling component is greater than a thickness of the bolometric detection component, a width of the coupling component is greater than a width of the bolometric detection component, and the coupling component has an end adjacent to the bolometric detection component that tapers in a thickness direction and a width direction so that the wider and thicker coupling component is coupled to the bolometric detection component.

* * * * *